United States Patent
Liu et al.

(10) Patent No.: US 7,895,195 B2
(45) Date of Patent: Feb. 22, 2011

(54) METHOD AND APPARATUS FOR CONSTRUCTING A LINK STRUCTURE BETWEEN DOCUMENTS

(75) Inventors: Shixia Liu, Beijing (CN); Li Ping Yang, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 11/996,108

(22) PCT Filed: Jul. 4, 2006

(86) PCT No.: PCT/EP2006/063876
§ 371 (c)(1),
(2), (4) Date: Jan. 18, 2008

(87) PCT Pub. No.: WO2007/012550
PCT Pub. Date: Feb. 1, 2007

(65) Prior Publication Data
US 2008/0222138 A1 Sep. 11, 2008

(30) Foreign Application Priority Data
Jul. 29, 2005 (CN) .......................... 2005 1 0088825

(51) Int. Cl.
*G06F 7/00* (2006.01)
*G06F 17/30* (2006.01)

(52) U.S. Cl. ...................................... 707/723; 707/726

(58) Field of Classification Search ................. 707/736, 707/723, 726, 999.005
See application file for complete search history.

(56) References Cited

U.S. PATENT DOCUMENTS 5,745,360 A 4/1998 Leone et al.
(Continued)

FOREIGN PATENT DOCUMENTS

EP 1267280 A2 12/2002

OTHER PUBLICATIONS

Ziyang Wang; Improved Link-Based Algorithms for Ranking Web Pages; New York University Computer Science Department technical report TR2003-846. Jun. 2003; 10 pages.

*Primary Examiner*—James Trujillo
*Assistant Examiner*—Pavan Mamillapalli
(74) *Attorney, Agent, or Firm*—Schmeiser, Olsen & Watts; John Pivnichny

(57) ABSTRACT

A method and computer system for constructing a link structure for T documents. An initial link structure G0 between the T documents is generated. For each document d of D documents of the T documents, a loop of no more than M iterations is performed. In each iteration: a search engine is used to generate a ranking order of T' documents consisting of the T documents except document d; the initial link structure G0 is modified according to the ranking order to generate a modified link structure G; if a condition is satisfied then the loop is exited and the modified link structure G1 is outputted, otherwise G0 is set equal to G1 and a next iteration of the loop is performed. The condition is that a measure of a difference between G0 and G1 is less than a specified threshold or the M iterations were performed.

14 Claims, 2 Drawing Sheets

U.S. PATENT DOCUMENTS

| | | |
|---|---|---|
| 5,920,859 A | 7/1999 | Li |
| 6,049,799 A | 4/2000 | Mangat et al. |
| 6,138,129 A | 10/2000 | Combs |
| 6,167,397 A * | 12/2000 | Jacobson et al. .................... 1/1 |
| 6,377,259 B1 * | 4/2002 | Tenev et al. ................. 345/440 |
| 6,449,640 B1 | 9/2002 | Haverstock et al. |
| 6,457,028 B1 * | 9/2002 | Pitkow et al. .............. 715/206 |
| 6,574,644 B2 | 6/2003 | Hsu et al. |
| 6,654,739 B1 * | 11/2003 | Apte et al. ......................... 1/1 |
| 6,691,112 B1 | 2/2004 | Siegel et al. |
| 7,028,029 B2 * | 4/2006 | Kamvar et al. ......... 707/999.003 |
| 7,231,393 B1 * | 6/2007 | Harik et al. ........................ 1/1 |
| 7,499,934 B2 * | 3/2009 | Zhang et al. ....................... 1/1 |
| 2003/0061214 A1 * | 3/2003 | Alpha ........................... 707/7 |
| 2005/0144179 A1 * | 6/2005 | Maruhashi et al. .......... 707/100 |
| 2006/0143197 A1 * | 6/2006 | Kaul et al. .................. 707/100 |

\* cited by examiner

METHOD AND APPARATUS FOR CONSTRUCTING A LINK STRUCTURE BETWEEN DOCUMENTS

TECHNICAL FIELD

The present invention relates to document information management technology, more particularly, relates to method and apparatus for constructing a link structure between documents.

BACKGROUND

In most cases, information is related to other information. Information is linked together via links and a link topology structure is formed. The link topology is important information about information. A typical example of important linked systems is WWW. The WWW is a hyperlinked collection. In addition to the textual content of individual pages, the link structure of such collections contains important information which can be helpful to user for searching the required information. For example, consider the significance of a link p→q: With such a link p suggests, or even recommends, that surfers visiting p follow the link and visit q.

Link analysis algorithms try to mine useful information from the link structure and improve the performance of the search engines. Taking advantage of the link structure of the Web, a global "importance" ranking of every web page can be produced.

Unfortunately, most enterprise documents lack links or even do not have link. This makes the information search in the enterprises become difficult.

SUMMARY

In view of the shortcoming of the prior arts, one object of the present invention is to provide a method for constructing link structure between a plurality of documents, and especially to provide a method for constructing link structure between non-HTML documents.

Another object of the present invention is to provide a method for document search. Wherein, a link structure is constructed between a plurality of documents, then the search is carried out with the link structure. Thus, the ranking mechanism of a search engine could be improved.

The present invention provides a method and corresponding apparatus (i.e., computer or computer system). A computer program (i.e., instructions) stored on a non-transitory storage medium of the computer perform the method when executed by the computer.

Preferably, the present invention provides a method for modifying a link structure between a plurality of documents, wherein the plurality of documents have an initial link structure G0 between the plurality of documents. According to the method, for every document d of at least part of the documents with its respective query, apply ranking mechanism with a search engine to other documents of the plurality of documents with the initial link structure G0 to generate ranking results. Then, modify the initial link structure G0 according the ranking results to generate a modified link structure G1. Treat G1 as G0 and iteratively carrying out the above steps, until the change between G0 and G1 is less than a given threshold or the iterative times reach a predefined N. Output the modified link structure G1.

For example, the plurality of documents comprise document 1, 2, 3, 4, 5, 6, 7, 8, 9, 10, 11 and 12. It could be understood by a person skilled in the art, in the above method and apparatus according to the present invention, for every document d with its respective query, of the at least part of the documents (e.g. document 1, 2, 3, 4 or 12) of the plurality of documents (e.g. document 1, 2, 3, 4, 5, 6, 7, 8, 9, 10, 11 and 12), apply ranking mechanism with a search engine to other documents (e.g. when document d is document 4, other documents are document 1, 2, 3, 5, 6, 7, 8, 9, 10, 11 and 12) of the documents with the initial link structure G0 to generate ranking results. This step could comprise, but not limited to any one or more of the following:

For every document of at least part of the documents with its respective query, based on every query, apply ranking mechanism with a search engine to other documents of the documents with the initial link structure G0 to generate ranking results.

For every document of at least part of the documents with its respective query, based on more query, apply ranking mechanism with a search engine to other documents of the documents with the initial link structure G0 to generate ranking results.

For every document, based on multiple queries separately or based on multiple queries at the same time, apply ranking mechanism with a search engine to other documents of the documents with the initial link structure G0 to generate ranking results.

For every document of at least part of the documents with its respective query, at each time of applying ranking mechanism: for a document, may be based on more of its query; for an other document, may be based on one of its query, applying ranking mechanism with a search engine to other documents of the documents with the initial link structure G0 to generate ranking results.

The present invention provides an iterative method for linking a plurality of existing documents, especially linking a plurality of non-HTML documents. According to the method, web-like link structure could be constructed between enterprise documents. Search capability could be improved with the link structure.

Preferably, for every non-HTML document A, search documents which are related to document A. Create links between document A and these related documents. Thus, web-like link structure could be constructed between enterprise documents. Based on the link structure, apply ranking mechanism with a search engine to the documents with the link structure to generate ranking results. Then, modify the link structure according the ranking results to generate a modified link structure. The link structure will be improved by iteratively carrying out the above two steps. The improved link structure will facilitate document search.

Preferably, a virtual network could be built between non-HTML documents. The structure of the virtual network is similar to the structure of World Wide Web. The created link structure according to the present invention could be used by a search engine to improve its recall and precision. The enterprise search engine according to the present invention will help an enterprise document user find required information.

DETAILED DESCRIPTION

The detailed description of each preferable embodiment according to the present invention will be illustrated with the attached figures as following.

Figure 1:
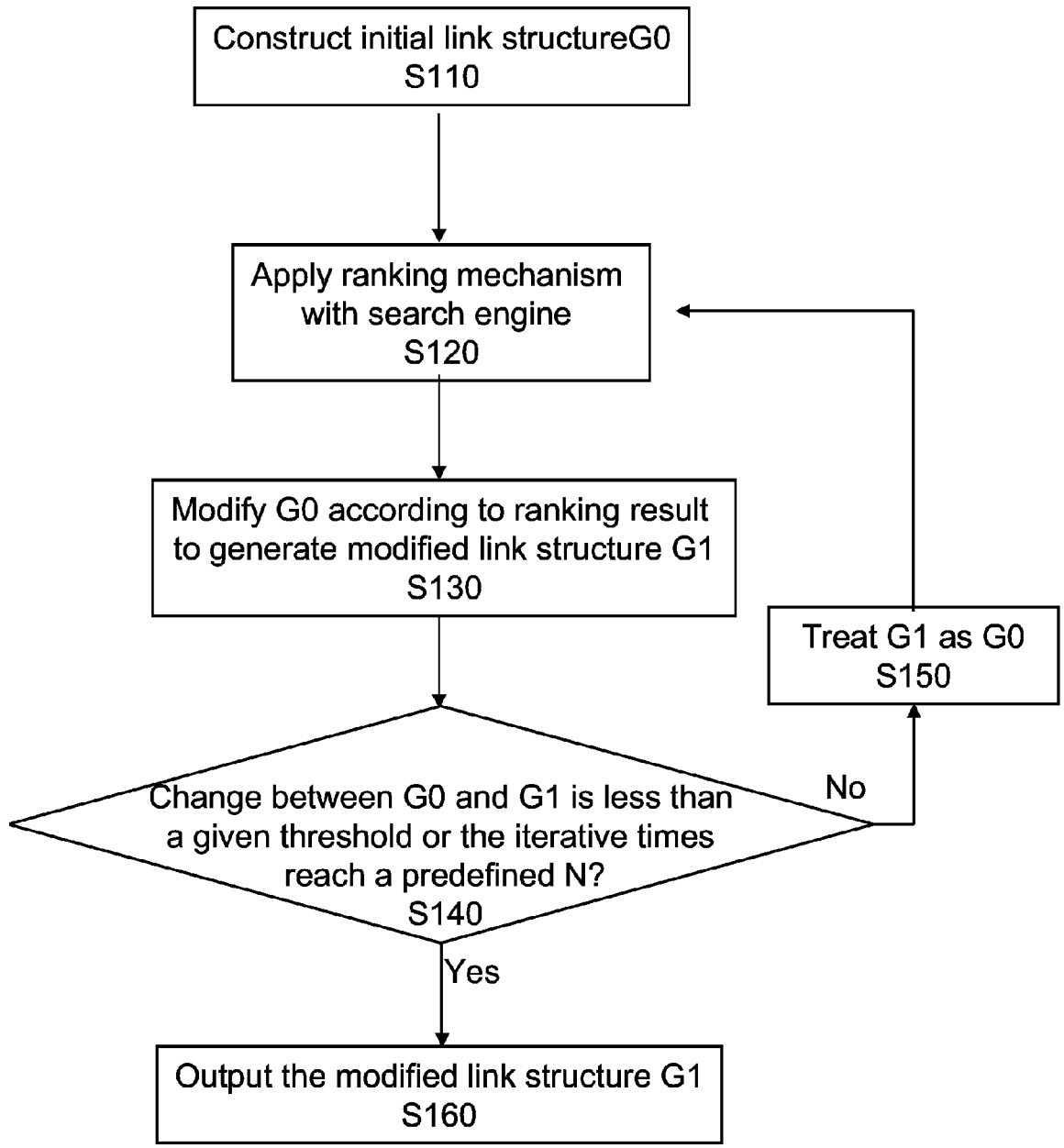
FIG. 1 is a flowchart of a method in accordance with an embodiment of the present invention.

FIG. 1 is a flowchart of a method in accordance with an embodiment of the present invention. The flowchart illustrates a method for constructing link structure between a plurality of documents. Wherein, there might be no link or some existing links between the documents. The existing links could be treated as part of the initial links in the following text.

A person skilled in the art could understand that the method could also be used to modify a constructed link structure between documents.

In FIG. 1, at step S110, construct a plurality of initial links for the documents to build an initial link structure G0 between the documents. Constructing a plurality of initial links for the documents could be carried out by many existing methods. For example, based on the relation between a query (e.g. key words, subject words or other query obtained from a text segment of a document) in a document and other documents, build the initial links; or build the initial links based on a reference to other documents; or build the initial links according to the storage directory relationship between documents.

At step S120, for every document d of at least part of the documents with its one or more respective queries, applying ranking mechanism with a search engine to other documents of the documents with the initial link structure G0 to generate ranking results. For every document of the documents, more queries could be used at each time when ranking mechanism is applied with a search engine to other documents of the documents with the initial link structure G0 to generate ranking results.

The query may comprise a keyword, a subject word or other query obtained from a text segment of a document. Applying ranking mechanism for web-pages is a well-known technology in the art, for example, the web-page ranking mechanism used by the well-known "google" search engine. In the present invention, a document is treated as a web page when applying ranking mechanism.

At step S130, modify the initial link structure G0 according the ranking results to generate a modified link structure G1. The modifying could be carried out but not limited to the following method. For every query of every document, after applying ranking mechanism with a search engine to other documents of the documents with the initial link structure G0, select the first N documents of other documents in the ranking result. N is a natural number. Maintain or create links from the document d to the first N documents, and delete links from the document d to unselected documents. Selection of documents and/or links could be also based on weighted selection method according to the documentations' ranking result.

At step S140, compare the modified link structure G1 with the initial link structure G0. The difference between G1 and G0 could be presented by the number of corresponding different links, or by other method for present link structure difference. For example, if the number of different links between the modified link structure G1 and the initial link structure G0 is K, then modify K links of the link structure G0 could obtain link structure G1. If the difference between the initial link structure G0 and the modified link structure G1 is not less than a given threshold, then treat G1 as G0 and go back to step S120.

Iteratively carry out steps S120-S140 until the difference or change between G0 and G1 is less than a given threshold or steps S120-S140 have been performed a predefined maximum number (M) of iterations. Then, at step S160, output the modified link structure G1 as the final link structure of the plurality of documents.

Over the past years, enterprises have become much better at extracting information from databases. Unfortunately, although huge amount of information of enterprises is stored in unstructured documents, e.g. memorandums, articles and emails, enterprises do not begin to mine these unstructured data until recently. However, extracting information from these unstructured data is not as effective as extracting information from a database. Keyword could be used for searching information, but do not know which of these keyword matched documents is the most important document to a user. This frustrated search result is now turning into a crisis—as enterprises continually work to increase their productivity, they need to reorganize the information they have, and they can no longer afford to neglect these information. Therefore, an enterprise needs an effective search engine to search information in the enterprise internally.

In the above iterative method, linking the existing non-HTML documents could be implemented by the following method.

Build web-like initial link structure G0 for the non-HTML documents.

The basic idea for the method is to find some candidate documents for every document to build links. For example, the candidate document could be selected by the following ways.

1) If a document definitely cites another document, then the cited document is a candidate document.
2) Create a link according to a named entity in a document.

The link might be a hyperlink or a virtual hyperlink.

For example, if some paragraphs of a given document A focus on a certain named entity, and this named entity is a representative named entity of another document B, then a link can be built from A to B.

3) Build virtual hyperlinks by query

In this method, some queries are extracted from a given document A, and then with each of these queries, find some related documents from the existing enterprise documents based on the current search engines. Next, some candidate documents can be selected from the related documents for creating links between them.

In this method, queries from the given document could be generated by the following ways. First, the document is divided into several document segments. Then a query is generated for each of the document segments.

The following existing history algorithm could be used to generate the text segment to be processed. The history algorithm uses terms in previous text segments to aid in generating a query for the current text segment. Text segments could also be obtained by simply dividing a document into several text segments, e.g. use a paragraph of a document as a text segment, or treat paragraphs related with a certain subject as a text segment.

The history algorithm mainly utilizes the following document property: the context that leads up to the current text may contain the terms that are still valuable in generating the query for the current text segment.

Presently, for information processing, texts are mainly represented with vector space model. The basic idea of the vector space model is to represent text with term vectors: ($W_1$, $W_2$, $W_3$ . . . $W_n$), wherein, $W_i$ is the weight of the i-th term.

Characters, words or phrases are usually selected as term. Words are more preferred than characters or phrases. Therefore, in order to represent a text as a term vector in vector space, the text will be divided to text word segments. These word segments will be treated as dimension of the vector to represent the text. The initial presentation for a vector is in the form of 0,1, i.e. if a word occurs in the text then the value for the dimension of the term (word) is 1, otherwise, is 0. This method could not represent the frequency value of a word in the text. Therefore, 0, 1 is gradually replaced with precise word frequency. The word frequency comprises absolute word frequency and relative word frequency. Absolute word frequency is the frequency of a word appeared in the text. Relative word frequency is a normalized word frequency which is mainly calculated by the tf-idf algorithm.

In history algorithm, select a text segment (or text stream) to generate a query. In the method for processing electronic document according to one aspect of the present invention, a part of a document could be selected as a text segment, or a text segment could be automatically generated with an algorithm from a document. First, the document is preprocessed. According to the processing methods based on currently available technologies, the preprocessing methods comprises: the operation for extracting text segment from the document, and the operation for removing stopwords from the extracted text segment.

If the text segment is generated automatically, history algorithm can be used to generate a text segment, which is relevant to the content of the document and need to be processed. Such a method is mainly based on such a property: the previous context that leads up to the current text may be relevant to current text segment and is helpful in generating the query for it. Here, history algorithm uses terms or words in the previous text segments to aid in generating a query (queries) for current text segment. In other words, with the relevance degree between the term vectors, the vector representation (for the old segment and it can be represented as vector v1) of the text segment S previous to current text segment and the term vector of current text segment, the combination of corresponding text segments is determined and the text segment is generated then. That's to say, history algorithm combines the previous associated text segment with new text segments to generate the text segment that needs to be processed. Specifically, for text segments, the representation of vector stores the weight of each word, except stopwords, in the text segment. The method includes following processes:

i) Calculate the weight of each word, except the stopwords, in previous associated text segment, for example, utilizing the tf-idf algorithm, as shown in equation (1):

$$w_j = tf * idf \qquad (1)$$

In equation (1), tf represents the frequency of the term occurred in the text segment S.

idf=all_segments/term_segments. Here, all_segments is the number of independent text segments, which are the text segments used to generate a query (queries), in the whole document. And term_segments is the number of independent segments that contain the given term. It can be known that a query may correspond to several keywords, or keyword string, or some simple questions in currently available retrieving technologies.

ii) According to the weight of each term in text segment, calculate the degree of similarity or degree of relevance of the present text segment to multiple previous text segments S. Specifically, when receiving a new segment T, tf-idf algorithm is used to construct the vector of v2 for representing new text segment. Then it checks the similarity of new text segment T to the old text segment S by computing a similarity score of their vectors, respectively, v2 and v1.

iii) Compare the similarity score of current text segment T and previous associated segment S with a given threshold. If the similarity score is higher than the threshold, it can be inferred that current text segment T is similar to the previous text. Otherwise, T is not similar to the previous text segment.

If text segment T is similar to the earlier text, the old term vector v1 is decreased via multiplying every weight by attenuation factor $\alpha$ ($0<\alpha<1$) and then the two vectors are merged into vector v3, and the vector v1 is replaced with v3. The candidate text segment ST can be obtained by combining S and T. Then T is replaced with ST and continues to receive new text segment. If T is dissimilar with previous text, segment T is current candidate text segment needed to be processed. Moreover, v1 is replaced with v2, and S replaced with T, thus good preparation is made for generating next text segment.

In the following description, queries will be generated for text segment T, S or ST. It could be understood by a person skilled in the art that for a given text segment, there are many methods to generate a query. First, the author of the document may input a query or queries that are believed to be most relevant to the text segment. Second, a query or queries could be generated with currently available algorithm. For example, a keyword could be generated from a given text segment with tf-idf algorithm. A keyword could be selected based on a combined term vector.

At last, the query or queries are provided to a current search engine to obtain a search result. The most relevant document in the search result could be selected as candidate documents for the given document. Ranking mechanism could be used with a search engine and first several documents in the search result are selected as candidate documents. The most relevant documents could also be selected by the following methods. Selecting the first 100 documents to form a document set D. Then, calculate the vector representation VD for the document set. For example, generate VD by calculating the frequency of a term occurrence in the document set. A document j in each set could also be represented as a vector Vdj. Then, calculate the similarity between every document and the cluster with Sim(D,dj)=cos(VD, Vdj). The document with the biggest similarity value is selected as a candidate document.

The initial links generated in the above steps form an initial link structure G0. For every document d of at least part of the documents or of all the documents, use every or some of queries generated from the document and apply ranking mechanism with a search engine to other documents of the documents with the initial link structure G0 to generate ranking results. Every document here is taken as a web page and internet ranking mechanism is applied. Then, the initial link structure G0 is modified according the ranking results to generate a modified link structure G1. For example, for a plurality of documents being applied with ranking mechanism, select the first N documents (N is a natural number). Maintain or create links from the above document d to the first N documents. Delete links from the document d to other documents.

As an alternative, for the above given document d, a plurality of documents, e.g. 3, 4, 5 or 6 documents are selected from the documents with ranking results. Then, maintain or create links from the above document d to the plurality of documents. Delete links form the document d to other documents.

Treating G1 as G0 and iteratively carrying out the above steps for modifying link structure, until the change between the modified link structure G1 and the initial link structure G0 is less than a given threshold or the iterative times reach a predefined number N.

When the iterative times reach a predefined maximum number M of iterations (see step S140 of FIG. 1), there are at most M web-like link structures. They are represented as G1, G2, . . . Gi, . . . , GM. The final link structure G could be obtained by the following methods: a node of the final link structure G is the node that is comprised by every link structure; an edge of the final link structure G is the edge that is comprised by at least a predefined fraction (e.g., ⅓) of the M web-like link structures Gi (i=1, . . . , M). For example, if an edge eij is contained in at least ⅓ of the intermediate M web-like link structures, then edge eij is comprised in the final link structure G.

Figure 2:
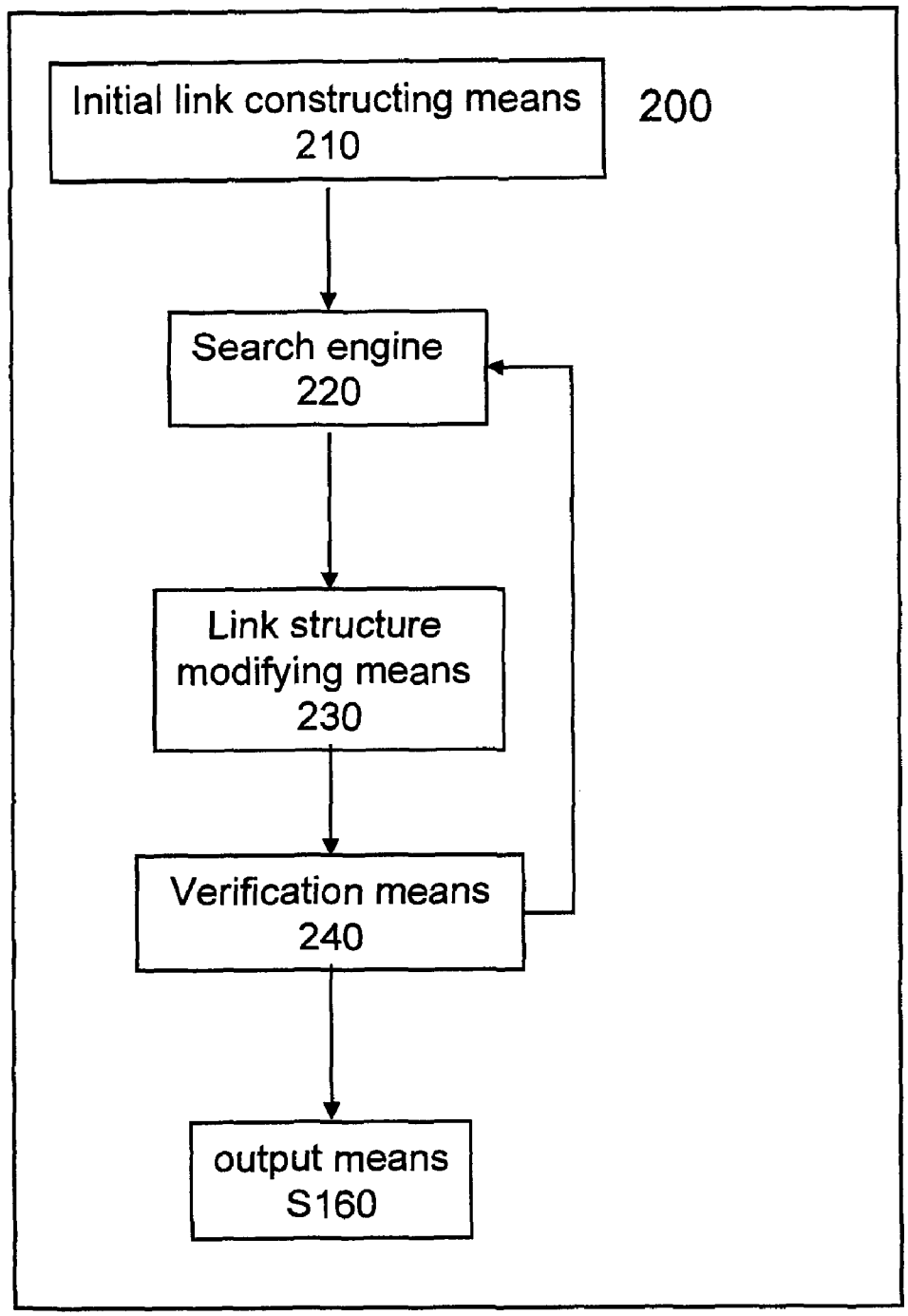
FIG. 2 is a block diagram of an apparatus in accordance with another embodiment of the present invention.

FIG. 2 is a block diagram for apparatus 200 for constructing link structure for a plurality of documents according to another embodiment of the present invention. The apparatus for constructing link structure for a plurality of documents is configured to carry out the above method of the present invention. The apparatus comprises: initial link constructing means 210, for constructing a plurality of initial links for the documents to build an initial link structure G0 between the documents; Search engine 220, being configured that for every document d of at least part of the documents with its respective query, applying ranking mechanism with the search engine to other documents of the documents with the initial link structure G0 to generate ranking results; link structure modifying means 230, for modifying the initial link structure G0 according the ranking results to generate a modified link structure G1; and verification means 240 for verifying whether the change between G0 and G1 is less than a given threshold or the number of times for modifying the link structure reaches a predefined number, if not, treating G1 as G0 and further modifying the modified link structure with the Search engine and the link structure modifying means; if yes, then outputting the modified link structure G1 with an output means 250.

The present invention also provides a searching method. The searching method comprises: constructing a link structure between a plurality of documents according to the above method; and carry out searching with the link structure in the documents. The searching method could be based on keyword, document type or time.

The present invention also provides a storage medium or signal carrier comprising instructions for carrying out the method of the present invention.

The preferred embodiments of the present invention have been described in detail. However, one skilled in the art will realize that the preferred embodiments are only given for the purpose of illustration, and should not be construed as liming the preset invention thereto. This invention can be implemented by way of software, hardware or the combination of the two. One skilled in the art can make various modifications and variations to the present invention, however, these modifications and variations are all within the scope and spirit of the invention as defined in the accompanying claims.

The invention claimed is:

1. A method for constructing a link structure for T documents, said method comprising:
 a computer generating an initial link structure G0 comprising a plurality of initial links between the T documents, each document of the T documents comprising at least one query, each query comprising at least one keyword, said T at least 2;
 for each document d of the T documents, said computer performing a loop consisting of no more than M iterations, M being a predefined maximum number of iterations, M being greater than 2, each iteration of the loop comprising the steps of:
  i) using a search engine to generate a ranking order of T' documents that consist of all documents of the T documents except document d;
  ii) modifying the initial link structure G0 in accordance with the ranking order to generate a modified link structure G1;
  iii) ascertaining whether a condition is satisfied, said condition being that a measure of a difference between G0 and G1 is less than a specified threshold or said M iterations have been performed;
  iv) if said ascertaining ascertains that the condition is satisfied then exiting the loop followed by outputting the modified link structure G1, otherwise setting G0 equal to G1 followed by performing a next iteration of the loop comprising steps i), ii), Hi), and iv);
 wherein M iterations have been performed resulting in generation of M modified link structures G1 in step ii);
 wherein after M iterations have been performed and said exiting the loop has been performed, the method further comprises said computer determining and outputting a final link structure G;
 wherein the final link structure G comprises each node that is commonly comprised by the M modified link structures; and
 wherein the final link structure G comprises each edge that is commonly comprised by at least a predefined fraction of the M modified link structures.

2. The method of claim 1, wherein step iv) ascertains in a first iteration of the loop that the condition is satisfied.

3. The method of claim 1, wherein step iv) ascertains in a first iteration of the loop that the condition is not satisfied.

4. The method of claim 1, wherein each document of the T documents is a non-HTML document.

5. The method of claim 1, wherein pre-existing links between documents of the T documents existed prior to said generating the initial link structure G0, and wherein said generating the initial link structure G0 comprises including the pre-existing links in the initial link structure G0.

6. The method of claim 1, wherein the measure of the difference between G0 and G1 is a total number of different links between G1 and G0.

7. The method of claim 1, wherein step ii) comprises:
 said computer selecting the first N documents ranked highest in the ranking order, such that a remaining T'-N documents are ranked below the first N documents in the ranking order, wherein N is less than T';
 said computer maintaining or creating a link from document d to each document of the first N documents; and
 said computer deleting the links from document d to the remaining T'-N documents.

8. A computer system comprising a computer program stored on a non-transitory storage medium, said computer program including instructions configured to be executed on the computer system to perform a method for constructing a link structure for T documents, said method comprising:
 generating an initial link structure G0 comprising a plurality of initial links between the T documents, each document of the T documents comprising at least one query, each query comprising at least one keyword, said T at least 2;
 for each document d of the T documents, performing a loop consisting of no more than M iterations, M being a predefined maximum number of iterations, M being greater than 2, each iteration of the loop comprising the steps of:
  i) using a search engine to generate a ranking order of T' documents that consist of all documents of the T documents except document d;
  ii) modifying the initial link structure G0 in accordance with the ranking order to generate a modified link structure G1;
  iii) ascertaining whether a condition is satisfied, said condition being that a measure of a difference between G0 and G1 is less than a specified threshold or said M iterations have been performed;
  iv) if said ascertaining ascertains that the condition is satisfied then exiting the loop followed by outputting the modified link structure G1, otherwise setting G0 equal to G1 followed by performing a next iteration of the loop comprising steps i), ii), iii), and iv);
wherein M iterations have been performed resulting in generation of M modified link structures G1 in step ii);
wherein after M iterations have been performed and said exiting the loop has been performed, the method further comprises determining and outputting a final link structure G;
wherein the final link structure G comprises each node that is commonly comprised by the M modified link structures; and
wherein the final link structure G comprises each edge that is commonly comprised by at least a predefined fraction of the M modified link structures.

9. The computer system of claim 8, wherein step iv) ascertains in a first iteration of the loop that the condition is satisfied.

10. The computer system of claim 8, wherein step iv) ascertains in a first iteration of the loop that the condition is not satisfied.

11. The computer system of claim 8, wherein each document of the T documents is a non-HTML document.

12. The computer system of claim 8, wherein pre-existing links between documents of the T documents existed prior to said generating the initial link structure G0, and wherein said generating the initial link structure G0 comprises including the pre-existing links in the initial link structure G0.

13. The computer system of claim 8, wherein the measure of the difference between G0 and G1 is a total number of different links between G1 and G0.

14. The computer system of claim 8, wherein step ii) comprises:
  selecting the first N documents ranked highest in the ranking order, such that a remaining T'-N documents are ranked below the first N documents in the ranking order, wherein N is less than T';
  maintaining or creating a link from document d to each document of the first N documents; and
  deleting the links from document d to the remaining T'-N documents.

* * * * *